(12) United States Patent
Byun et al.

(10) Patent No.: US 8,728,640 B2
(45) Date of Patent: May 20, 2014

(54) BATTERY PACK AND METHOD OF FABRICATING THE SAME

(75) Inventors: Jeong-Deok Byun, Suwon-si (KR);
Kyung-Won Seo, Suwon-si (KR);
Yong-Geol Kwon, Suwon-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 1179 days.

(21) Appl. No.: 12/285,223

(22) Filed: Sep. 30, 2008

(65) Prior Publication Data

US 2009/0098418 A1 Apr. 16, 2009

(30) Foreign Application Priority Data

Oct. 15, 2007 (KR) .................. 10-2007-0103499

(51) Int. Cl.
*H01M 10/04* (2006.01)
*H01M 2/30* (2006.01)

(52) U.S. Cl.
USPC .............................................. 429/7; 429/163

(58) Field of Classification Search
USPC ........................................ 429/7, 163, 61, 175
See application file for complete search history.

(56) References Cited

U.S. PATENT DOCUMENTS

| 2004/0060169 | A1 | 4/2004 | Yokoyama et al. | |
| 2005/0208346 | A1* | 9/2005 | Moon et al. | 429/7 |
| 2006/0251931 | A1* | 11/2006 | Kim | 429/7 |
| 2007/0160878 | A1* | 7/2007 | Kim et al. | 429/7 |
| 2008/0160398 | A1* | 7/2008 | Kim | 429/121 |

FOREIGN PATENT DOCUMENTS

| CN | 1918726 | 2/2007 |
| JP | 2000-268781 | 9/2000 |
| JP | 2002-231201 | 8/2002 |
| JP | 2006-187185 | 7/2006 |
| KR | 20-0302619 | 10/2002 |
| KR | 10-2005-0081175 A | 8/2005 |
| KR | 10-0542677 | 1/2006 |
| KR | 10-2006-0012810 A | 2/2006 |

OTHER PUBLICATIONS

Korean Office Action issued on Mar. 27, 2009 in the corresponding Korean Patent Application No. 10-2007-0103499.
Office action from Chinese Patent Office issued in Applicant's corresponding Chinese Patent Application No. 200810170040.5 dated Mar. 25, 2010, and its English translation.
Korean Notice of Allowance issued on Sep. 23, 2009 corresponding to Korean Patent Application No. 10-2007-0103499.

* cited by examiner

*Primary Examiner* — Ula C Ruddock
*Assistant Examiner* — Frank Chernow
(74) *Attorney, Agent, or Firm* — Robert E. Bushnell, Esq.

(57) ABSTRACT

A battery pack and a method of fabricating the same. The battery pack includes a bare cell including an electrode terminal, a protection circuit board electrically connected to the bare cell, the protection circuit board including a plurality of metal tabs arranged at opposite ends thereof, and a case surrounding the protection circuit board, the case being perforated by a plurality of first apertures arranged at locations that correspond to ones of the plurality of metal tabs. The method includes arranging a bare cell having a cap plate and an electrode terminal passing through a terminal aperture in the cap plate, electrically connecting a protection circuit board to the bare cell, the protection circuit board having metal tabs arranged at both ends thereof and arranging a case to surround the protection circuit board, the case being perforated by a plurality of first apertures that are arranged at locations that correspond to ones of the metal tabs.

20 Claims, 7 Drawing Sheets

BATTERY PACK AND METHOD OF FABRICATING THE SAME

CLAIM OF PRIORITY

This application makes reference to, incorporates the same herein, and claims all benefits accruing under 35 U.S.C. §119 from an application earlier filed in the Korean Intellectual Property Office on 15 Oct. 2008 and there duly assigned Serial No. 10-2007-0103499.

BACKGROUND OF THE INVENTION

1. Field of the Invention

The present invention relates to a battery pack having metal tabs arranged at both ends of a protection circuit board and a case having apertures arranged at a location that corresponds to the metal tabs, and a method of fabricating the same.

2. Description of the Related Art

Recently, various compact handheld electronic/electrical devices, such as cellular phones, notebook computers, camcorders, and so on, have been widely developed and produced. The handheld electronic/electrical devices include a battery pack installed therein to operate the same without a separate power source. The battery pack can be classified into a nickel-cadmium (Ni—Cd) battery, a nickel-metal hydride (Ni—MH) battery, and a lithium (Li) battery. The battery pack using a secondary (i.e., rechargeable) battery is generally used in consideration of economic efficiency.

Among the types of batteries, the Li secondary battery is widely used for the handheld electronic/electrical devices due to an operating voltage three times higher and a higher energy density per unit weight than the Ni—Cd battery and the Ni—MH battery. The Li secondary battery can be classified into a Li ion battery using a liquid electrolyte and a Li polymer battery using a polymer electrolyte depending on the kind of electrolytes, or can be classified into a cylindrical, rectangular or pouch type depending on a manufactured shape thereof.

In general, the battery pack using the Li secondary battery includes a bare cell and a protection circuit assembly. The bare cell includes a can having an upper opening and accommodating an electrode assembly that includes a positive electrode plate and a negative electrode plate which respectively have electrode tabs connected to current collectors coated with active materials, and a separator arranged between the positive electrode plate and the negative electrode plate, and a cap assembly for sealing the upper opening of the can. The protection circuit assembly is electrically connected to the bare cell to prevent overcharge or over-discharge of the bare cell. The protection circuit assembly includes a protection circuit board for controlling voltage and current when the bare cell is charged or discharged, and an upper case for protecting the protection circuit board from external impact.

Specifically, the secondary battery includes a bare cell having a can for accommodating an electrode assembly and a cap assembly, and a protection circuit board coupled to the bare cell to adjust voltage or current upon charge or discharge. The cap assembly includes a cap plate for covering an opening into which the electrode assembly is inserted into the can, an electrode terminal insulated from the cap plate via a gasket, and a lead plate for electrically contacting the bare cell with the protection circuit board. In addition, a current circuit breaker, (e.g., a positive temperature coefficient (PTC)), is also coupled to the cap plate and insulated with double-sided tape.

However, when using the PTC, space and expense are required for forming an electrical terminal of the PTC for forming a contact between the PTC and the electrode terminal and between the PTC and the electrical terminal of the protection circuit board. Further, the lead plate connected to the bare cell, the electrical terminal of the PTC, and the electrical terminal of the protection circuit board have a substantially an L-shape for electrical connection with the protection circuit board. The L-shaped terminals are fixed to the bare cell or the protection circuit board at their horizontal parts. Since vertical parts of the L-shaped terminals are welded to each other with corresponding parts overlapping each other, the vertical parts of the L-shaped terminal can increase the entire length of the secondary battery. That is, as described above, it can be difficult to provide both a small size and a large capacity secondary battery due to the space required to form the electrical terminal of the PTC, the vertical parts of the L-shaped terminal, and so on. In addition, in order to insulate the entire PTC, including the electrical terminal, from the cap plate, double-sided insulating tape or the like needs to be adhered to the cap plate, thereby increasing material and process costs.

SUMMARY OF THE INVENTION

The present invention provides a battery pack and a method of fabricating the same, capable of reducing the entire length of the battery pack, by eliminating the need for the L-shaped electrical terminals.

In addition, the present invention provides a battery pack and a method of fabricating the same, capable of simplifying a connection structure between a bare cell and a protection circuit board to reduce component and process costs.

Further, the present invention provides a method of coupling a case surrounding a protection circuit board to the protection circuit board.

According to an aspect of the present invention, a battery pack includes a bare cell including an electrode terminal, a protection circuit board electrically connected to the bare cell, the protection circuit board including a plurality of metal tabs arranged at opposite ends thereof and a case surrounding the protection circuit board, the case being perforated by a plurality of first apertures arranged at locations that correspond to ones of the plurality of metal tabs.

The case can further include a second aperture arranged at a location that corresponds to the electrode terminal. The protection circuit board further includes a lead terminal arranged at a location that corresponds to the electrode terminal, the electrode terminal can be electrically connected to the protection circuit board via the lead terminal. The protection circuit board can be perforated by an aperture arranged at a location that corresponds to the lead terminal, the lead terminal can be arranged within the aperture perforating the protection circuit board. One of the metal tabs can be a lead tab that is electrically connected to the protection circuit board. The lead tab can include a positive temperature coefficient material. The positive temperature coefficient material can also include a lower electrode, a body, and an upper electrode vertically arranged in sequence. Another of the metal tabs can be a dummy tab, the dummy tab can be electrically insulated from the protection circuit board.

The case can have a larger thickness at locations that correspond to ones of the metal tabs than at all other locations. The locations of the case that correspond to the ones of the metal tabs can be adhered to the ones of the metal tabs. The first plurality of apertures can be tapered. Each of the first plurality of apertures can have a taper angle in a range of 5 to 30 degrees with respect to a vertical cross-section of the cap plate. The case can also include a plurality of gaps arranged at end portions of corresponding ones of the metal tabs. The case can also include a plurality of discharge passages, each of said discharge passages can extend from corresponding ones of the gaps. The battery pack can also include a plurality of first caps, each of said first caps can be arranged within a corresponding one of said first apertures. The battery pack can also include a second cap arranged within the second aperture. The battery pack can also include a submerged area arranged in the second aperture and on the second cap. Each of the metal tabs can be made out of nickel. The lead terminal can be made out of nickel.

According to another aspect of the present invention, there is a method of making a battery pack, including arranging a bare cell having a cap plate and an electrode terminal passing through a terminal aperture in the cap plate, electrically connecting a protection circuit board to the bare cell, the protection circuit board having metal tabs arranged at both ends thereof and arranging a case to surround the protection circuit board, the case being perforated by a plurality of first apertures that are arranged at locations that correspond to ones of the metal tabs. The method can also include electrically connecting the metal tabs to the cap plate by a laser welding process. The laser welding process can be performed through ones of the first apertures of the case. The method can also include arranging a lead terminal of the protection circuit board at a location that corresponds to the electrode terminal and electrically connecting the lead terminal to the electrode terminal by a resistance welding process. The method can also include arranging a second aperture in the case at a location that corresponds to the electrode terminal, wherein the resistance welding process can be achieved through the second aperture.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1A:
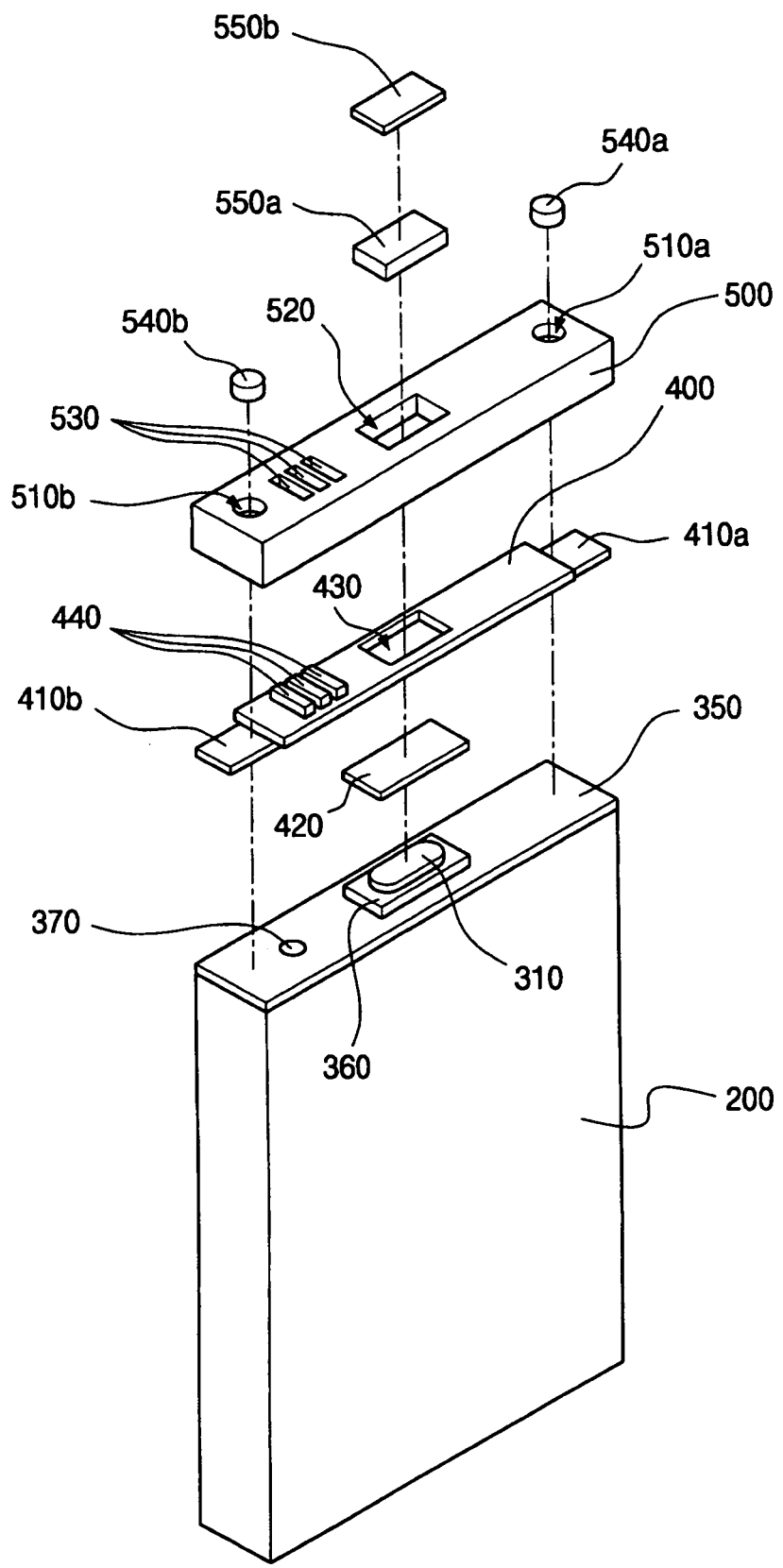
FIG. 1A is an exploded perspective view of a battery pack in accordance to the first exemplary embodiment of the present invention.

The present invention will now be described more fully hereinafter with reference to the accompanying drawings, in which exemplary embodiments of the invention are shown. This invention can, however, be embodied in different forms and should not be construed as limited to the embodiments set forth herein. In addition, the length and thickness of layers and regions may be exaggerated for clarity. Like reference numerals designate like elements throughout the specification.

Figure 1B:
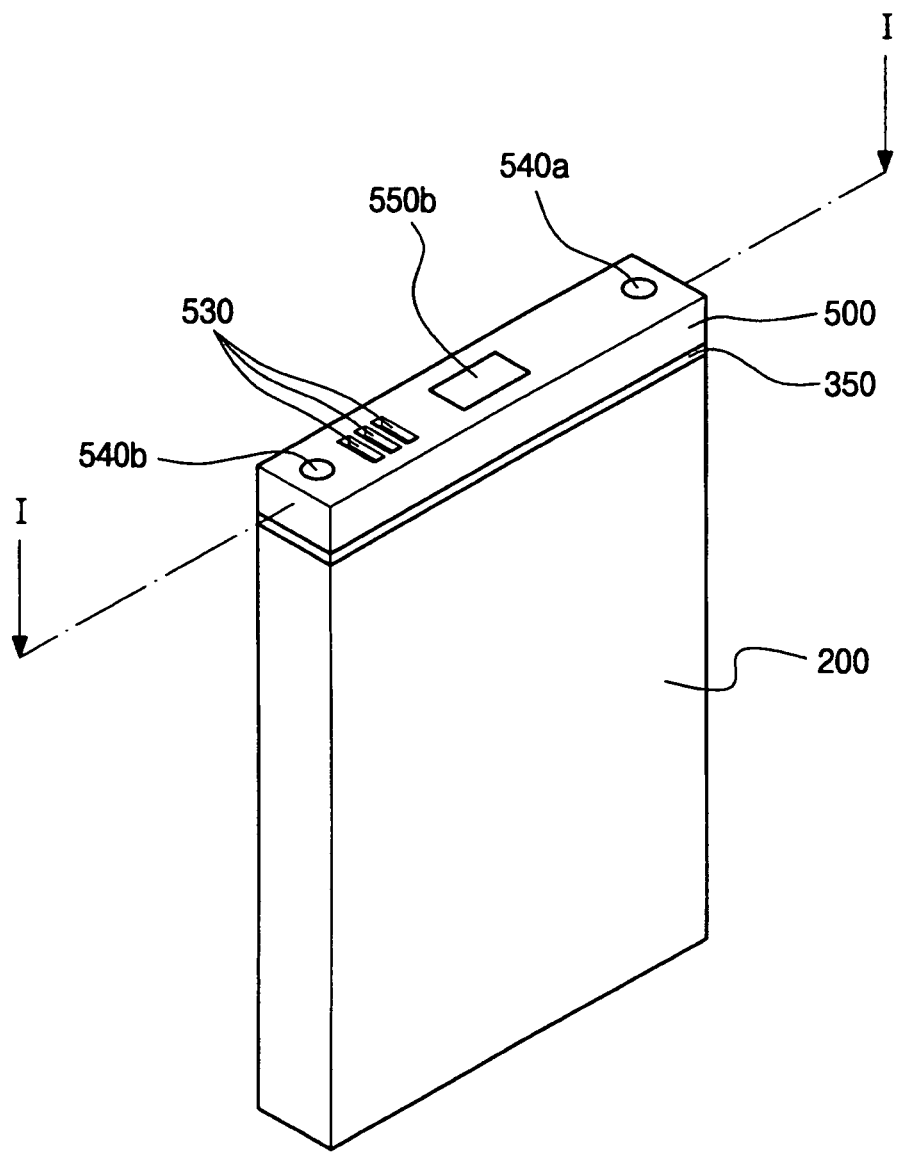
FIG. 1B is a perspective view showing an assembled state of the battery pack of FIG. 1A.
Figure 1C:
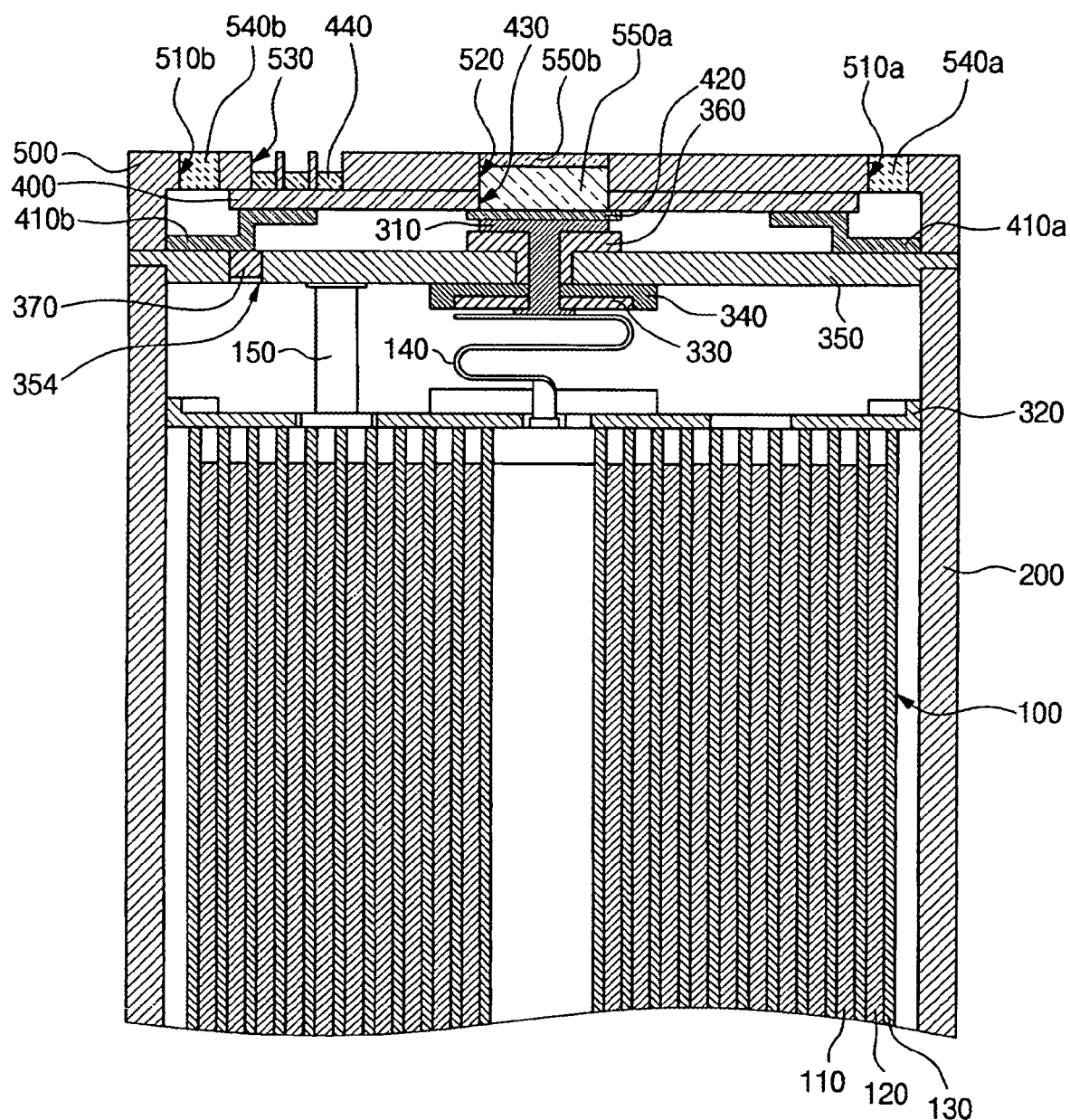
FIG. 1C is across-sectional view of the battery pack of FIG. 1A taken along line I-I of FIG. 1B.

Turning now to FIGS. 1A through 1C, FIG. 1A is an exploded perspective view of a battery pack in accordance to the first exemplary embodiment of the present invention, FIG. 1B is a perspective view showing an assembled state of the battery pack of FIG. 1A, and FIG. 1C is a cross-sectional view of the battery pack taken along line I-I of FIG. 1B.

Referring first to FIGS. 1A, 1B and 1C, the battery pack can generally include a bare cell and a protection circuit board 400. The bare cell can include an electrode assembly 100, an electrolyte, a can 200 accommodating the electrode assembly 100 and the electrolyte, and a cap assembly having a cap plate 350 covering an opening of the can 200. The protection circuit board 400 is coupled to the bare cell to adjust voltage or current upon charging or discharging. At this time, the protection circuit board 400 can be surrounded by a case 500.

Constitution of the battery pack in accordance with a first exemplary embodiment of the present invention will be described below. First, the electrode assembly 100 is made by winding a laminated body in a rolled manner. The laminated body includes a positive electrode 110, a separator 130, and a negative electrode 120 which are made out of a thin plate or film.

The rectangular can 200 is made out of substantially rectangular aluminum or aluminum alloy. Here, edges of the rectangular can may be rounded. The electrode assembly 100 is inserted through the open upper end of the can 200 such that the can 200 functions as a vessel for the electrode assembly 100 and an electrolyte.

The cap assembly includes a flat cap plate 350 having a size and shape corresponding to the open upper end of the can 200. In addition, the cap plate 350 has a terminal through-aperture through which an electrode terminal 310 made out of nickel passes. A tube-shaped gasket 360 is installed outside the electrode terminal 310 passing through the cap plate 350 to electrically insulate the electrode terminal 310 from the cap plate 350. In addition, an insulating plate 340 is arranged at a lower surface of a center part of the cap plate 350 adjacent to the terminal through-aperture, and a terminal plate 330 is installed at a lower surface of the insulating plate 340. A positive electrode tab 150 extending from the positive electrode 100 is welded to one surface of the cap plate 350, and a negative electrode tab 140 extending from the negative electrode 120 and folded in a serpentine manner is welded to a lower end of the electrode terminal 310. At this time, a lead terminal 420 is made out of the same material as the electrode terminal 310 and is arranged on the electrode terminal 310 in order to electrically connect the electrode terminal 310 to the protection circuit board 400, which will be described in a following paragraph.

Meanwhile, an insulating case 320 is installed at an upper surface of the electrode assembly 100 to electrically insulate the electrode assembly 100 from the cap assembly and to cover the upper end of the electrode assembly 100. The insulating case 320 can be made out of insulating polymer resin such as polypropylene. In addition, a lead through-aperture, which is the negative electrode tab 140, is arranged at a center part of the insulating case 320 and an electrolyte through aperture is situated at other side parts thereof. Further, an electrolyte injection aperture 354 is formed at one side of the cap plate 350. A cover 370 is installed at the electrolyte injection aperture 354 to seal the electrolyte injection aperture after injection of the electrolyte. The bare cell includes the can 200 accommodating the electrode assembly 100 and the cap plate 350 covering the opening of the can 200, constitutes the bare cell in accordance with the present invention.

Meanwhile, the protection circuit board 400 is arranged on the cap plate 350. An external input/output terminal 440 is formed on the protection circuit board 400 to be electrically connected to the exterior. Furthermore, in accordance with the first exemplary embodiment of the present invention, the protection circuit board 400 includes metal tabs 410a and 410b arranged at opposite ends thereof and made out of a nickel material. Here, one of the metal tabs 410a and 410b can be a lead tab 410a electrically connected to the protection circuit board 400 and electrically connecting the cap plate 350 to the protection circuit board 400, and the other of the metal tabs 410a and 410b can be a dummy tab 410b electrically insulated from the protection circuit board 400.

At this time, the protection circuit board 400 and the metal tabs 410a and 410b can be electrically connected by soldering or can be connected by resistance welding in consideration of the influence on components mounted on the protection circuit board 400. In addition, the metal tabs 410a and 410b can be electrically connected to the cap plate 350 by laser welding.

Further, an aperture 430 is arranged at a location on the protection circuit board 400 that corresponds to the lead terminal 420. The lead terminal 420 electrically connects the electrode terminal 310 to the protection circuit board 400. The protection circuit board 400 and the lead terminal 430 can be electrically connected by soldering or can be connected by resistance welding in consideration of the influence on components mounted on the protection circuit board 400. In addition, the lead terminal 420 can be electrically connected to the electrode terminal 310 by resistance welding. In the drawings, while the lead terminal is arranged under the protection circuit board aperture, the lead terminal can instead be arranged over the protection circuit board aperture or can be inserted into the protection circuit board aperture.

In the electrical connection between the bare cell and the protection circuit board in accordance with a first exemplary embodiment of the present invention, the electrode terminal 310 electrically connected to the negative electrode tab 140 is electrically connected to the protection circuit board 400 through the lead terminal 420, and the cap plate 350 electrically connected to the positive electrode tab 150 is electrically connected to the protection circuit board 400 through the metal tabs 410a/410b.

Since the entire length of the electrical connection can be reduced by removing the vertical parts of the conventional L-shaped electrical terminals, it is possible to minimize a space between the bare cell and the protection circuit board so that the entire length of the battery pack is reduced. In addition, when the battery pack is manufactured according to the conventional art, the lead plates are welded to the bare cell and the protection circuit board, and the lead plates are welded to each other. As a result, in order to electrically connect the bare cell to the protection circuit board, three welding processes are needed. However, since the battery pack in accordance with the present invention can electrically connect the bare cell to the protection circuit board through two welding processes, it is possible to reduce a manufacturing process of the battery pack.

The battery pack in accordance with a first exemplary embodiment of the present invention has the protection circuit board 400 in accordance with the present invention surrounded by the case 500. Generally, the case 500 surrounding the protection circuit board 400 can be an integrated type, an embedded type, or the like. The integrated type case is formed by a method of connecting the protection circuit board to an upper end surface of the bare cell and injecting a nylon-based synthetic resin material to outside the protection circuit board of the bare cell at a low temperature and a low pressure. In addition, the embedded type case is formed by a method of embedding the protection circuit board in synthetic resin to form the protection circuit board embedded case, and then coupling the protection circuit board embedded case to the upper end surface of the bare cell.

However, the present invention provides a method of forming a cover type case. The cover type case 500 can be formed by a method of coupling a pre-formed synthetic resin case to the bare cell connected to the protection circuit board, or a method of coupling the pre-formed synthetic resin case to the protection circuit board and then coupling the same to the bare cell.

In addition, the case 500 has first apertures 510a and 510b corresponding to regions in which the metal tabs 410a and 410b are arranged, and a second aperture 520 corresponding to a region in which the lead terminal 420 is arranged. As described above, the case in accordance with the present invention can be formed as a cover type. As the first apertures 510a and 510b and the second aperture 520 are formed at the case, the protection circuit board can be coupled to the pre-formed case and then can be coupled to the bare cell. That is, after the protection circuit board including the metal tabs and the lead terminal is coupled to the case, the metal tabs can be electrically connected to the cap plate by welding, and the lead terminal can be electrically connected to the electrode terminal by welding. However, the electrical connection between the metal tabs and the cap plate can be achieved by laser welding through the first apertures 510a and 510b formed in the case corresponding to regions in which the metal tabs are arranged.

In addition, the electrical connection between the lead terminal and the electrode terminal can be achieved by resistance welding or laser welding through the second aperture 520 formed in the case corresponding to a region in which the lead terminal is arranged and the aperture 430 formed in the protection circuit board corresponding to a region in which the lead terminal is arranged. Therefore, the aperture formed in the case enables the case to be coupled to the protection circuit board by a method of coupling the pre-formed synthetic resin case to the bare cell connected to the protection circuit board. Furthermore, the case and the protection circuit board can be coupled to each other by a method of coupling the pre-formed synthetic resin case to the protection circuit board and then coupling the same to the bare cell.

At this time, after completion of the battery pack, in order to prevent damage to the terminal and the protection circuit board in the battery pack due to foreign substances, moisture, and so on that could pass through the first apertures 510a and 510b and the second aperture 520 formed in the case, first rubber caps 540a and 540b and a second rubber cap 550a can be inserted into the first apertures and the second aperture, respectively. In addition, as shown in the drawings, a submerged area 550b can be arranged on the second cap 550a in the second aperture 520. Further, the case 500 can have a third aperture 530 exposing the external input/output terminal 440 on the protection circuit board 400. The external input/output terminal 440 is electrically connected to the exterior through the third aperture 530.

Hereinafter, a method of fabricating a battery pack will be described with reference to the above components. First, the electrode assembly 100 is formed by winding a laminated body including a positive electrode 110, a separator 130, and a negative electrode 120 which are made out of a thin plate or film in a rolled shape, accommodating the laminated body in a rectangular can, and assembling a cap assembly including a cap plate for covering an upper opening of the can to provide a bare cell.

Sequentially, a protection circuit board 400, including metal tabs 410a and 410b made out of a nickel material, are installed at both ends thereof and an aperture formed at a location that corresponds to the electrode terminal is provided. At this time, the protection circuit board 400 and the metal tabs 410a and 410b can be electrically connected to each other by soldering or can be connected by resistance welding in consideration of influence on components mounted on the protection circuit board 400.

In addition, a lead terminal 420 is electrically connected to a lower side of the protection circuit board aperture 430. At this time, the protection circuit board 400 and the lead terminal 420 can be electrically connected to each other by soldering or can be connected by resistance welding in consideration of influence on components mounted on the protection circuit board 400.

Furthermore, a pre-formed cover type case 500 made out of synthetic resin is provided. As described above, the case 500 has first apertures 510a and 510b formed in regions in which the metal tabs 410a and 410b are arranged, a second aperture 520 formed at a location in which the lead terminal 420 is arranged, and a third aperture 530 exposing the external input/output terminal 440 on the protection circuit board 400.

While the bare cell, the protection circuit board, and the case are formed by the respective manufacturing techniques and then provided, a sequence of providing the bare cell, the protection circuit board, and the case is not limited thereto. Furthermore, as described above, coupling of the bare cell, the protection circuit board and the case can be performed by a first method of electrically connecting the protection circuit board to the bare cell and then coupling the case thereto, or a second method of coupling the case to the protection circuit board and then coupling the same to the bare cell.

Specifically, the first method includes positioning the protection circuit board on the bare cell, welding the metal tabs 410a and 410b installed at the protection circuit board 400 to the cap plate 350 to electrically connect them, welding the lead terminal 420 installed at the protection circuit board 400 to the electrode terminal 310 to electrically connect them, and positioning the cover 500 to cover them. In this scenario, since the case is coupled after the protection circuit board is welded to the bare cell, it is possible to electrically connect the protection circuit board to the bare cell without interference by the case during welding.

In addition, the second method is a method of coupling the protection circuit board 400 to the case 500, and then welding the protection circuit board 400 to the bare cell to electrically connect them. Electrical connection between the metal tabs 410a and 410b and the cap plate 350 is performed by a laser welding technique through the first apertures 510a and 510b formed in the case 500 corresponding to regions in which the metal tabs are arranged. In addition, electrical connection between the lead terminal 420 and the electrode terminal 310 is performed by a resistance welding technique or a laser welding technique through the second aperture 520 formed in the case corresponding to a region in which the lead terminal is arranged and the aperture 430 formed in the protection circuit board corresponding to a region in the lead terminal is arranged. Therefore, although the second method is performed, since the aperture is formed in the case, it is possible to electrically connect the protection circuit board to the bare cell without interference by the case during welding.

At this time, in the first and second method, welding of the metal tabs and the cap plate can be by a laser welding technique, and welding of the lead terminal and the electrode terminal can be by a resistance welding technique.

In the present invention, the metal tabs and the lead terminal can be made out of nickel. Generally, when the cap plate is made out of metal such as aluminum and, since the metal tabs and the cap plate are made out of different materials, laser welding can be performed. In addition, the lead terminal and the electrode terminal can be laser-welded. However, when the electrode terminal is generally made out of metal such as nickel, since the electrode terminal and the lead terminal are made out of the same material, resistance welding can be performed at a low cost, rather than the laser welding. However, the present invention should not be construed as limited to the welding technique.

Therefore, the battery pack in accordance with the present invention can be manufactured. As described above, in order to prevent damage to the terminals and the protection circuit board in the battery pack due to foreign substances, moisture and so on, passing through the first apertures 510a and 510b and the second aperture 520 after completion of the battery pack, a cap or a submerged area can be arranged in the first apertures 510a and 510b and the second aperture 520.

Figure 2:
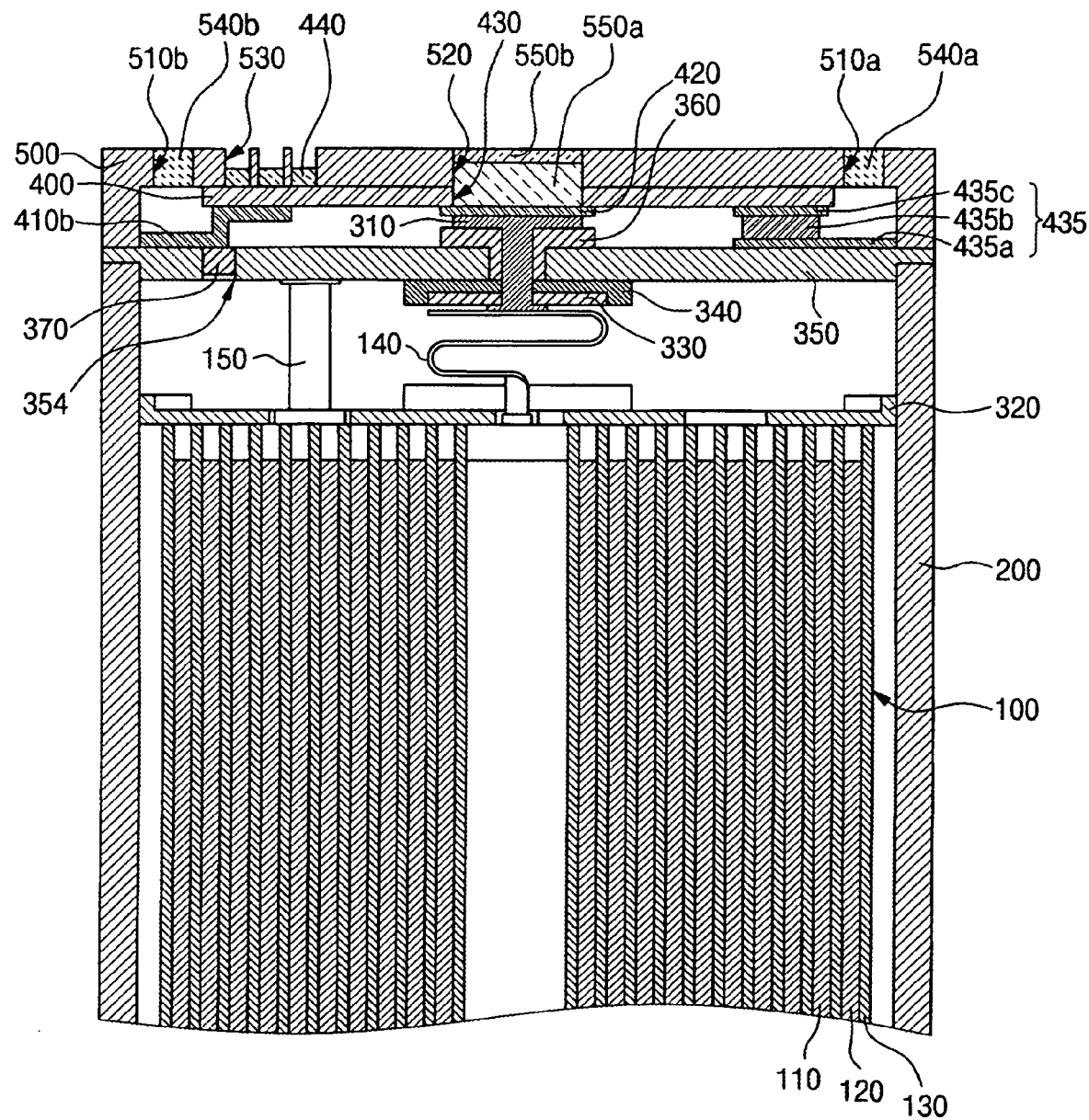
FIG. 2 is a cross-sectional view of a modification of a battery pack of FIG. 1A in accordance with a first exemplary embodiment of the present invention.

Turning now to FIG. 2, FIG. 2 is a cross-sectional view of a modification of a battery pack in accordance with a first exemplary embodiment of the present invention. The modified battery pack can have the same constitution as the first embodiment, except for the following description, and therefore, descriptions of components having the same constitution as that of FIGS. 1A through 1C will not be repeated.

As described above, in the first embodiment, the protection circuit board includes the metal tabs arranged at both ends thereof. Here, one of the metal tabs can be a lead tab electrically connected to the protection circuit board to electrically connect the cap plate to the protection circuit board, and the other of the metal tabs can be a dummy tab electrically insulated from the protection circuit board. The modification of the first embodiment in accordance with the present invention relates to the lead tab.

Referring to FIG. 2, the protection circuit board includes metal tabs 435a and 410b arranged at both ends thereof, and the metal tabs are comprised of a lead tab 435 electrically connected to the protection circuit board and a dummy tab 410b electrically insulated form the protection circuit board. At this time, the lead tab 435 includes a lower electrode 435a, a body 435b made out of a heat sensitive material, and an upper electrode 435c, which are vertically arranged in sequence. Here, the upper and lower electrodes are made out of a metal plate such as nickel and so on. The lower electrode 435a is in surface contact with the cap plate 350 and laser welded, and the upper electrode 435c is electrically connected to the protection circuit board 400 through resistance welding or soldering.

In the modification of the first embodiment in accordance with the present invention, the lead tab 435 functions as a current circuit breaker such as a positive temperature coefficient (PTC) 435 as well as electrically connects the protection circuit board to the cap plate. The PTC 435 functions to detect heat and to break the circuit when charge and discharge current are abnormally supplied to generate heat and increase the temperature. The current circuit breaker can be a bimetal switch type breaker or a thermal fuse. The present invention describes the PTC as an example of the current circuit breaker, and should not be construed as to limit the current circuit breaker.

Therefore, the lower electrode 435a of the PTC 435 can be directly connected to the cap plate 350 without interposing an insulating material to which the conventional PTC is attached. That is, a conventional double sided tape, and so on, for insulating the PTC from the cap plate is not used. In addition, since the vertical parts of the L-shaped electrical terminals for electrically connecting the PTC to the protection circuit board are removed to reduce the entire length of the battery pack by a length corresponding to the vertical parts, it is possible to minimize a space between the bare cell and the protection circuit board and thereby reduce the entire length of the battery pack.

Figure 3A:
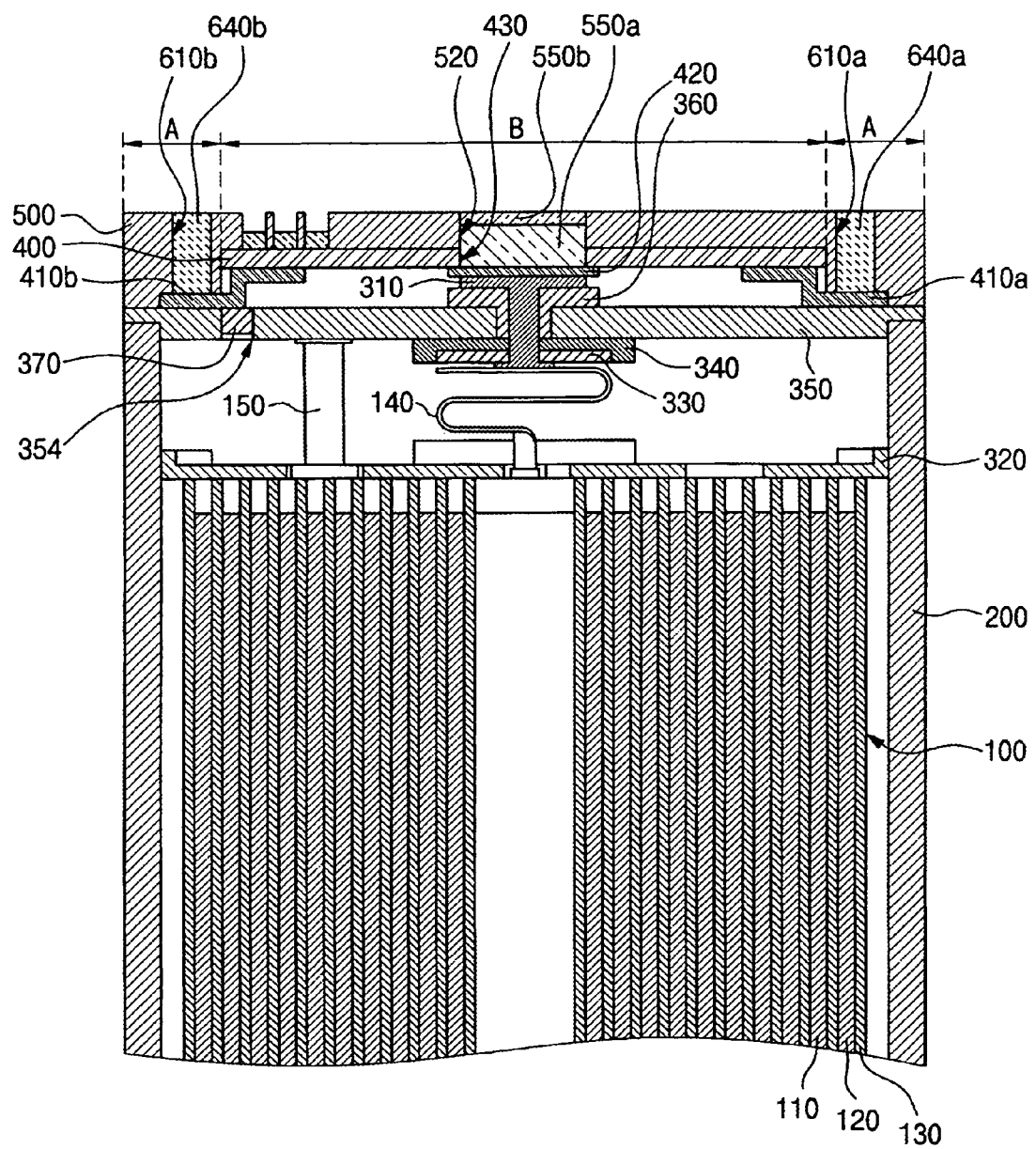
FIG. 3A is a cross-sectional view of a battery pack in accordance to the second exemplary embodiment of the present invention.

Turning now to FIG. 3A, FIG. 3A is a cross-sectional view of a battery pack in accordance with a second exemplary embodiment of the present invention. The battery pack in accordance with the second embodiment can have the same constitution as the first embodiment, except for the following description, and therefore, descriptions of components having the same constitution as the first embodiment will not be repeated.

Referring to FIG. 3A, in the case of the second embodiment, in contrast to the first embodiment, it will be appreciated that the thicknesses of A and B regions are different from each other. That is, since the region A of the case 500 corresponding to the metal tabs 410a/410b installed at both ends of the protection circuit board of the first embodiment have the same thickness as the region B, it is possible to maintain a certain gap between the metal tabs and the case. However, in the case of the second embodiment, the thickness of the region A of the case 500 corresponding to the metal tabs is larger than that of the region B of the case such that the metal tabs 410a/410b are adhered to the case 500. Thus, adhesion of the metal tabs to the case prevents vertical movement of the metal tabs to more securely fix the metal tabs to the cap plate 400.

Here, the case 500 has first apertures 610a and 610b formed in regions corresponding to the metal tabs of the protection circuit board to expose the metal tabs, similar to the first embodiment, and first caps 640a and 640b are arranged in the first apertures 610a and 610b. In addition, while not shown, like the modification of the first embodiment, one of the metal tabs can include a lower electrode, a body made out of a heat sensitive material, and an upper electrode, which are vertically arranged in sequence, to function as a current circuit breaker such as a PTC.

Figure 3B:
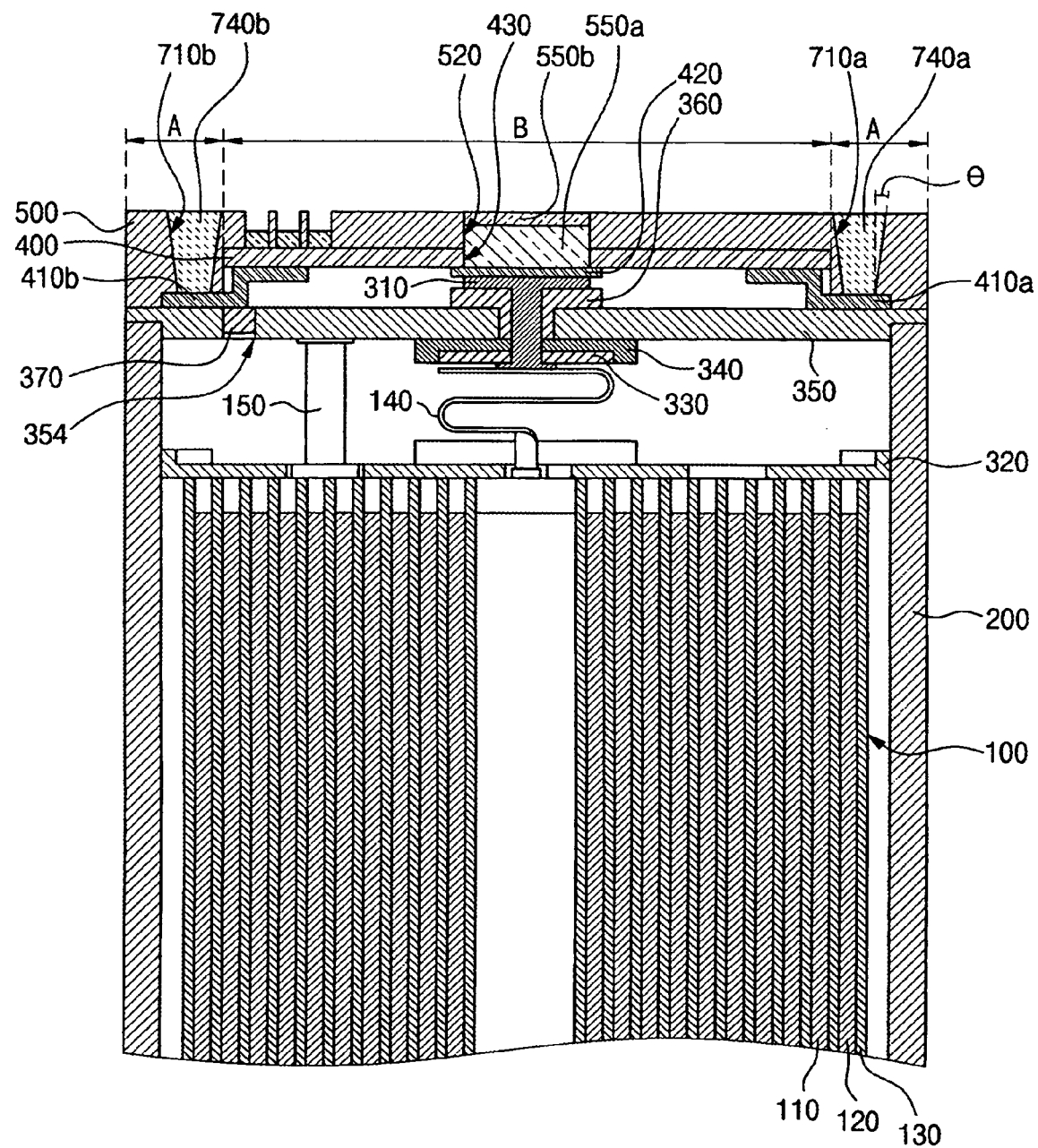
FIG. 3B is a cross-sectional view of a first modification of a battery pack of FIG. 3A.

Turning now to FIG. 3B, FIG. 3B is a cross-sectional view of a first modification of a battery pack in accordance with a first modification of the second exemplary embodiment of the present invention. The battery pack in accordance with the first modification can have the same constitution as the battery pack of FIG. 3A except for the following description, and therefore, descriptions of components having the same constitution as the battery pack of FIG. 3A will not be repeated.

Referring to FIG. 3B, the battery pack in accordance with the first modification of the second embodiment of the present invention includes a case having first apertures 710a and 710b that narrow from an upper side to a lower side thereof, i.e., have a tapered side surface. This tapered aperture sidewall profile is to prevent damage to the case due to an incidence angle of the laser welding during the laser welding process for electrically connecting the protection circuit board to the bare cell after coupling the protection circuit board to the case. Although the incidence angle of the laser welding may not be perpendicular to the cap plate due to a process error, it is possible to prevent damage to the case due to the laser by tapering the sidewalls of the apertures through which the laser welding occurs. In addition, a taper angle θ of apertures 710a/710b can have an angle of 5 to 30 degrees with respect to a vertical cross-section of the cap plate.

When the taper angle θ is less than 5° and an error of the laser incidence angle during a laser welding occurs, there is no case-damage prevention effect due to the laser. When the taper angle is more than 30°, since the upper side of the first aperture is opened too far. Therefore, the present invention preferably has the taper angle of 5 to 30°.

At this time, first caps 740a and 740b made out of a rubber material are arranged within the first apertures 710a and 710b. While not shown, like the modification of the first embodiment, one of the metal tabs can include a lower electrode, a body made out of a heat sensitive material, and an upper electrode, which are vertically arranged in sequence, to function as a current circuit breaker such as a PTC.

Figure 3C:
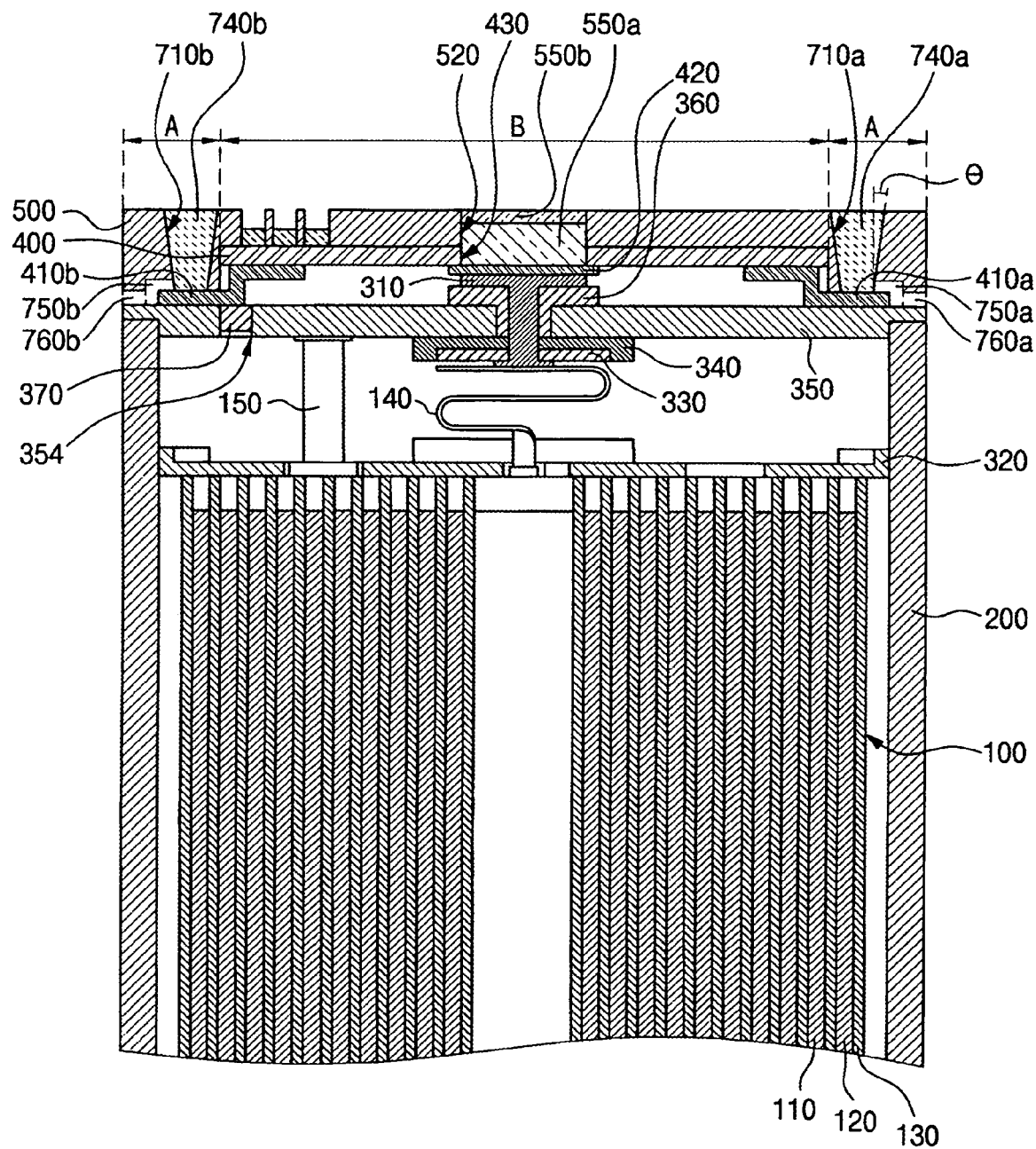
FIG. 3C is a cross-sectional view of a second modification of a battery pack of FIG. 3A.

Turning now to FIG. 3C, FIG. 3C is a cross-sectional view of a second modification of a battery pack in accordance with a second exemplary embodiment of the present invention. The battery pack in accordance with the second modification can have the same constitution as the battery pack of FIG. 3B except for the following description, and therefore, descriptions of components having the same constitution as that of FIG. 3B will not be repeated.

Referring to FIG. 3C, the battery pack in accordance with the second modification of the second embodiment of the present invention has gaps 750a and 750b formed in certain regions of the case, i.e., surroundings in which both ends of the metal tabs are arranged. Gaps 750a/750b are in order to protect the protection circuit board by discharging gas or heat generated during a laser welding process for electrically connecting the protection circuit board to the bare cell after coupling the protection circuit board to the case. Therefore, it is possible to discharge a portion of gas or heat through the gaps. In addition, discharge passages 760a and 760b extending from the gaps are formed at the case to discharge the gas or heat to the exterior.

While the first apertures 710a, 710b in the protection circuit board are tapered from an upper side to a lower side thereof, the second embodiment may not have the taper. In addition, while not shown, like the modification of the first embodiment of FIG. 2, one of the metal tabs can include a lower electrode, a body made out of a heat sensitive material, and an upper electrode, which are vertically arranged in sequence to function as a current circuit breaker such as a PTC.

In accordance with the present invention, the vertical parts of the conventional L-shaped electrical terminals can be eliminated to reduce the entire length of the battery pack by a length corresponding to the electrically connected vertical parts. In addition, since a current circuit breaker can be directly connected to the cap plate of the bare cell, thus replacing the conventional double sided insulating tape, the lead plate, and so on, it is possible to reduce component cost and component installation process cost. Further, the first apertures and the second aperture formed in the case enable the case to be coupled to the protection circuit board by coupling the case to the bare cell connected to the protection circuit board. Furthermore, the case can be coupled to the protection circuit board by coupling the protection circuit board to the case and then coupling the protection circuit board/case combination to the bare cell.

Although the present invention has been described with reference to specific exemplary embodiments thereof, it will be understood by those skilled in the art that a variety of modifications and variations can be made to the present invention without departing from the spirit or scope of the present invention defined in the appended claims and their equivalents.

What is claimed is:

1. A battery pack, comprising:
    a bare cell;
    a protection circuit board having a generally planar shape and having an electrical connection to the bare cell, the protection circuit board including a metal tab, the metal tab comprising a rectangular metal sheet having a length dimension and a width dimension, a first part of the metal tab overlapping the protection circuit board and a second part of the metal tab extending substantially beyond an outer perimeter of the protection circuit board along the entirety of its width dimension; and
    a case including a first aperture exposing the second part of the metal tab.

2. The battery pack of claim 1, further comprising a positive temperature coefficient material disposed between the protection circuit board and the first part of the metal tab.

3. The battery pack of claim 1, further comprising a dummy tab disposed between the bare cell and the protection circuit board, wherein the dummy tab is electrically insulated from the protection circuit board.

4. The battery pack of claim 3, wherein the metal tab physically and electrically contacts one end of the protection circuit hoard, and the dummy tab physically contacts the other end of the protection circuit board.

5. The battery pack of claim 1, wherein the case comprises a first region which overlaps the protection circuit board, and a second region which overlaps the second part of the metal tab, the first aperture of the case being disposed in the second region.

6. The battery pack of claim 5, wherein a side surface of the first aperture is tapered.

7. The battery pack of claim 6, wherein the first aperture has a taper angle in a range of 5 to 30 degrees with respect to a vertical cross-section of the protection circuit board.

8. The battery pack of claim 5, wherein the second region is thicker than the first region.

9. The battery pack of claim 1, wherein the metal tab comprises nickel.

10. A battery pack, comprising:
    a bare cell including a cap plate and an electrode terminal;
    a protection circuit board having a generally planar shape, including a metal tab electrically connected to the cap plate and having a width dimension aligned with a width dimension of the protection circuit board, a lead terminal electrically connected to the electrode terminal, and a board aperture exposing the lead terminal; and
    a case including a first aperture exposing a portion of the metal tab and a second aperture exposing the lead terminal exposed by the board aperture,
    the portion of the metal tab exposed by the first aperture extending substantially outward beyond an outer perimeter of the protection circuit board over the entire width dimension of the metal tab.

11. The battery pack of claim 10, wherein the second aperture of the case is vertically arranged to overlap with the board aperture of the protection circuit board.

12. The battery pack of claim 10, wherein the lead terminal is contact with the electrode terminal, and the metal tab is contact with the cap plate.

13. The battery pack of claim 10, further comprising a first rubber cap disposed in the first aperture of the case, and a second rubber cap disposed in the second aperture.

14. The battery pack of claim 13, further comprising a submerged area on the second cap.

15. The battery pack of claim 14, wherein the submerged area is disposed in the second aperture.

16. The battery pack of claim 10, wherein the lead terminal includes the same material as the electrode terminal, and the metal tab includes a different material from the cap plate.

17. The battery pack of claim 1, the metal tab being divided into three rectangular parts by two linear folds along the width dimension.

18. The battery pack of claim 17, the metal tab having two ends along the width dimension, the perpendicular distance between the two folds being substantially less than the perpendicular distance between either fold and the closest end.

19. The battery pack of claim 18, the parts of the metal tab comprising the two ends being parallel to each other.

20. The battery pack of claim 10, a first portion of the metal tab interfacing with the protection circuit board, the portion of the metal tab exposed by the first aperture being parallel to the first portion of the metal tab.

* * * * *